(12) United States Patent
Gruber et al.

(10) Patent No.: US 8,799,071 B2
(45) Date of Patent: Aug. 5, 2014

(54) PERSONALIZED VIDEO GENERATION

(75) Inventors: Danny Gruber, East St. Kilda (AU); Scott McAuley Thomson, Camberwell (AU)

(73) Assignee: QDC IP Technologies Pty Ltd, Adelaide (AU)

( * ) Notice: Subject to any disclaimer, the term of this patent is extended or adjusted under 35 U.S.C. 154(b) by 1466 days.

(21) Appl. No.: 12/093,314

(22) PCT Filed: Nov. 10, 2006

(86) PCT No.: PCT/AU2006/001680
§ 371 (c)(1),
(2), (4) Date: Oct. 20, 2008

(87) PCT Pub. No.: WO2007/053898
PCT Pub. Date: May 18, 2007

(65) Prior Publication Data
US 2009/0222870 A1      Sep. 3, 2009

Related U.S. Application Data

(60) Provisional application No. 60/735,148, filed on Nov. 10, 2005.

(30) Foreign Application Priority Data

Nov. 10, 2005  (AU) ................................ 2005906283
Oct. 11, 2006  (AU) ................................ 2006905664
Nov. 1, 2006   (AU) ................................ 2006906092

(51) Int. Cl.
G06Q 30/02    (2012.01)
G11B 27/034   (2006.01)

(52) U.S. Cl.
USPC ....................................... 705/14.49; 386/278

(58) Field of Classification Search
USPC ........................................ 705/14.49; 386/278
See application file for complete search history.

(56) References Cited

U.S. PATENT DOCUMENTS 7,904,922 B1 *   3/2011  Haberman et al. .............. 725/35
8,082,355 B1    12/2011  Weber et al.
(Continued)

FOREIGN PATENT DOCUMENTS

EP    0 926 677    6/1999
WO   01/77939    10/2001
(Continued)

*Primary Examiner* — Naresh Vig
(74) *Attorney, Agent, or Firm* — Seed IP Law Group PLLC

(57) ABSTRACT

A personalized video generation system, including: (i) a digital asset manager for storing a video project file marked with references to content groups and content substitution rules; (ii) an editing tool for accessing the file and displaying content of the file grouped based on the groups, and generating an interface for substituting content across a video corresponding to the file, the interface adjusting the references for the digital asset manager; and (iii) a content generation engine for processing the file and the rules, based on personal data for intended recipients, to access content items and generating a plurality of video project files for rendering as corresponding videos for the recipients. The system can also include (iv) a distribution engine for communicating with a least one distribution gateway for a delivery platform; and (v) a least one render engine for receiving the video project files, causing rendering of the videos for a respective delivery platform, and forwarding the videos to the distribution engine for distribution of the videos for the respective delivery platform.

39 Claims, 12 Drawing Sheets

(56) References Cited

U.S. PATENT DOCUMENTS

| | | | |
|---|---|---|---|
| 2002/0013943 A1 | 1/2002 | Haberman et al. | 725/39 |
| 2002/0067730 A1 | 6/2002 | Hinderks et al. | |
| 2002/0100042 A1 | 7/2002 | Khoo et al. | |
| 2002/0156842 A1 | 10/2002 | Signes et al. | |
| 2003/0149975 A1 | 8/2003 | Eldering et al. | |
| 2004/0117257 A1* | 6/2004 | Haberman et al. | 705/14 |
| 2012/0167134 A1 | 6/2012 | Hendricks et al. | |

FOREIGN PATENT DOCUMENTS

| | | |
|---|---|---|
| WO | 01/93161 A1 | 12/2001 |
| WO | 02/30112 A1 | 4/2002 |
| WO | 2004/023437 | 3/2004 |

* cited by examiner

PERSONALIZED VIDEO GENERATION

FIELD

The present invention relates to a video generation system, and more specifically to a system for automatically producing and distributing personalised video messages based on personal data.

BACKGROUND

Video production has developed significantly since linear editing required the splicing together of sections of analog film. Video editing tools, such as Apple Corporation's Final Cut Pro, now allow considerable flexibility in the production of video from clips of digital images, audio and text. The current production tools allow non-linear editing (NLE) as the clip, audio and text components or items can be individually adjusted and effects applied to each item.

The current production tools, however, still utilise a time-based methodology related to their heritage from linear editing processes, whereby individual components are represented on timeline tracks for editing. Content is developed, manipulated and replaced based on timeline structures. Normally, the production tools use a series of parallel tracks for editing all of which are segmented by some form of time markers. Whilst this may be sufficient for professional video editors, who are able to utilise the tools to make fine detail adjustments to the content components, the time-based approach has considerable limitations when editing video at macro levels for different purposes, or tailoring a video for different recipients. Editing at this level would also benefit from a more simplistic user interface.

For the production of commercial or advertising messages, the current video editing tools have primarily been directed to meeting the advertising industry's demand for "reach" and "frequency". Reach refers to the number of people a message reaches and frequency describes the number of times each person is exposed to a message. Reach and frequency are objectives that can be achieved by video messages for the traditional television, radio and press media. Labour, time and cost intensive video editing by professional editors can be justified if reach and frequency is desired. However, the development of digital communications networks and personal communication devices, such as the personal computer, personal digital assistant (PDA) and mobile or cellular telephone, has given rise to more desirable objectives which can now be achieved for advertising, being "personalised" and "version". Personalised refers to producing a commercial message for a single person or a group of persons that are specifically tailored for that person or group. Version refers to repurposing an existing video message for a new purpose, or group of persons.

For personalising, versioning or more specifically repurposing a video, the use of time in current video editing tools is not the best segmentor of content, particularly when editing a video project file. For example, content for a particular product in a message may be spread over the entire length of the video with many different clip items, text items, audio items and associated effects. This makes it particularly difficult for a professional video editor, let alone an advertising campaign manager, to repurpose existing video files to produce a large number of new personal videos for a new product.

It is desired to address the above or at least provide a useful alternative.

SUMMARY

In accordance with the present invention there is provided a personalised video generation system, including:
  a digital asset manager for storing a video project file marked with references to content groups and content substitution rules;
  an editing tool for accessing said file and displaying content of said file grouped based on said groups, and generating an interface for substituting content across a video corresponding to said file, said interface adjusting said references for said digital asset manager; and
  a content generation engine for processing said file and said rules, based on personal data for intended recipients, to access content items and generating a plurality of video project files for rendering as corresponding videos for said recipients.

The present invention also provides a video generation system, including:
  a data manager for storing a video project file including null effect code providing references to content items and processing rules;
  a content generation engine for processing said file and the referenced rules to access content items and generate a plurality of video project files from said file for rendering as corresponding videos.

The present invention also provides a video generation system, including:
  a data manager for storing a video project file including null effect code providing references to content items and processing rules; and
  a content generation engine for processing said file and the referenced rules to access content items and generate a plurality of video project files from said file for rendering as corresponding videos.

The present invention also provides a personalised video generation process, including:
  storing a video project file marked with references to content groups and content substitution rules;
  displaying content of said file grouped based on said groups;
  substituting content across a video corresponding to said file by adjusting said references; and
  processing said file and said rules, based on personal data for intended recipients, to access content items; and
  generating a plurality of video project files for rendering as corresponding videos for said recipients.

The present invention also provides a video generation process, including:
  storing procedural rules for accessing personal data of persons to determine content items, and a video project file tagged with references to said procedural rules; and
  parsing said video project file and processing said rules to generate a plurality of respective video project files for said persons.

The present invention also provides a video generation process, including:
  storing a video project file including null effect code providing references to content items and processing rules; and
  processing said file and the referenced rules to access content items and generate a plurality of video project files from said file for rendering as corresponding videos.

DRAWINGS

Preferred embodiments of the present invention are hereinafter described, by way of example only, with reference to the accompanying drawings, wherein.

DETAILED DESCRIPTION OF PREFERRED EMBODIMENTS

Figure 1:
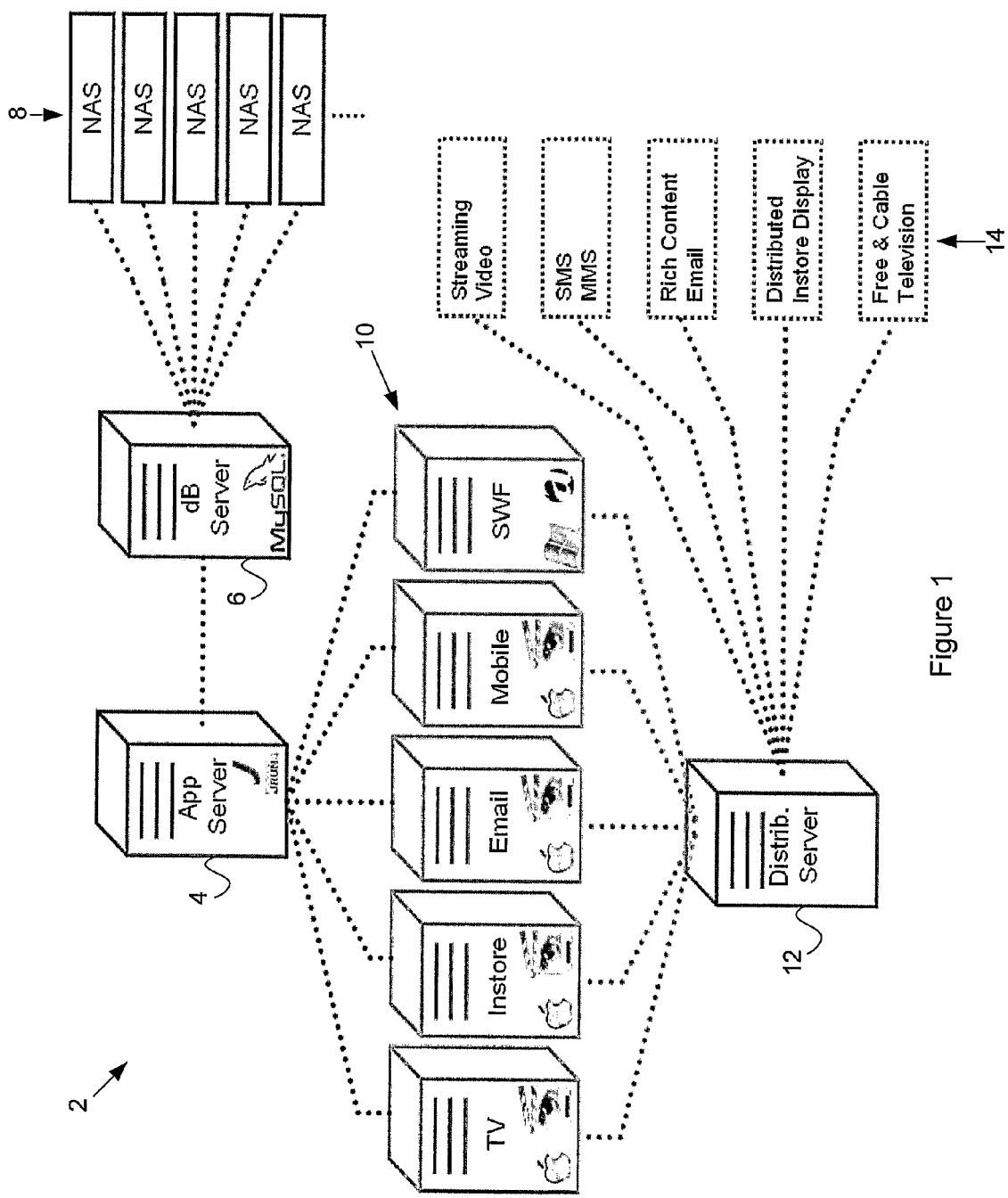
FIG. 1 is a preferred embodiment of a personalised video generation system.
Figure 2:
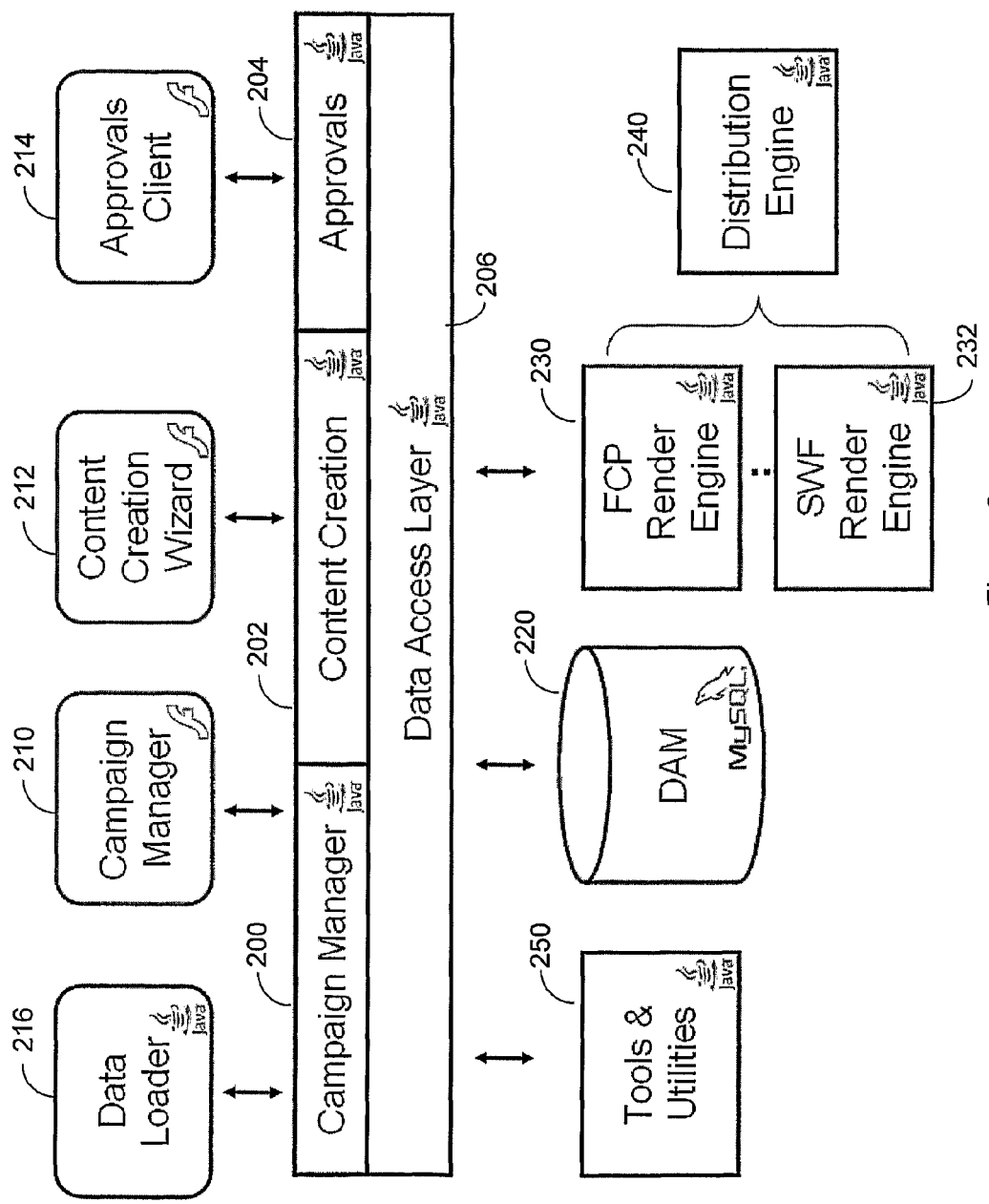
FIG. 2 is an architecture diagram of components of the system.
Figure 3:
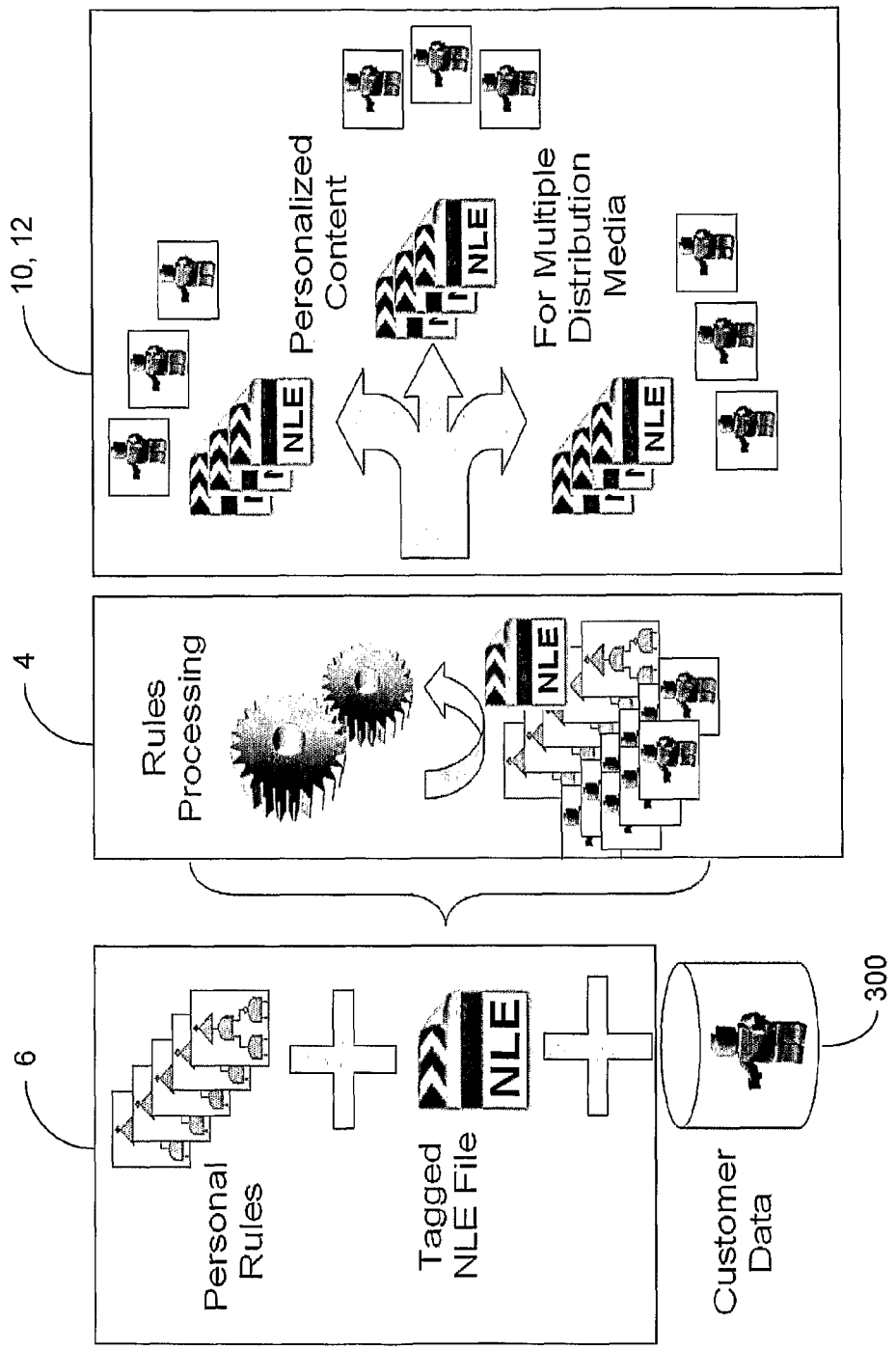
FIG. 3 is a logic diagram of the system.

A personalised video generation system 2, as shown in FIGS. 1 to 3, includes an application server 4 connected to a database server 6, which in turn is able to access data stored in a wide variety of local or remote data stores using network access servers (NASs) 8. The application server 4 may be a PC server, such as that provided by IBM Corporation, running JRun 4 by Macromedia, Inc. on Windows Server 2003. The application server 4 includes a number of server components, as shown in FIG. 2, including a campaign manager 200, content creation engine 202, an approvals manager 204, and a data access layer 206 for handling the communication of data between other parts of the system, such as the database server 6 and render servers 10. The application server 4 also provides a number of client components for access and execution on client computers that connect locally or remotely (eg via the Internet) to the application server 4. The client computers may be a personal computer, such as that provided by Lenovo Group Ltd, or a computer produced by Apple Corporation running Mac OS X. The client components include a campaign manager client 210, a content creation wizard 212, an approvals client 214 and a dataloader 216 for communicating respectively with the campaign manager 200, the content creation engine 202, the approvals manager 204 and the data access layer 206, of the application server 4. The client components provide the interfaces of the system 2 to generate the interface displays on a client computer. The client components are processed by a web browser running on the client computer, such that the displays are generated within the web browser and no installation process is required on the client machine. The web browser may be any browser that supports Java and Flash, such as FireFox, Safari by Apple Corporation or Internet Explorer.

The campaign manager 210, the content creation wizard 212 and the approvals client 214 may be written in Flash computer program code by Macromedia Inc., whereas the dataloader 216 and the server components 200 to 206 may be written in Java computer program code by Sun Microsystems Inc. Whilst this is the preferred implementation of the system 2, it will be understood by those skilled in the art that any of the software components 200 to 216 of the application server 4, and any other software components described herein, can be replaced or substituted at least in part by hardware components, such as dedicated ASICs (Application Specific Integrated Circuits) or FPGAs (Field Programmable Gate Arrays), to perform at least part of the processes performed by the components 200 to 216.

The database server 6 includes a digital asset manager (DAM) 220 which is based on the MySQL database. The database server may support other databases, for example Oracle, SQLServer or Ingres. The database server 6 may be an IBM PC server running MySQL on Linux, Microsoft Windows Server 2003 or Apple OS X. The DAM 220 provides access to a number of file servers via the NASs 8. The DAM 220 may store any data directly for operation of the system 2 or data merely associated with remote data that is required by the system 2. This may include digital moving or static images, audio files, rules or customer information. The system 2 can be linked to another party's DAM data source or CRM data. This allows the system to have access to any customer or personal data that may be held on a customer relationship management (CRM) database 300. The personal data of individuals or groups of individuals of the database 300 may be held on one or more file servers remotely or on the database server 6 itself. The personal data could include any personal information, such as name, age, income, status, address, preferences, etc. The personal data may include profile data that is collected using a number of different systems or processes. For example, the specification of Australian Patent Application 2006905664 filed on 11 Oct. 2006 by QDC Technologies Pty Ltd, and herein incorporated by reference, describes a system for collecting and using social network data associated with a person. Also, the specification of Australian Patent Application 2006906092 filed on 1 Nov. 2006 by QDC Technologies Pty Ltd, herein incorporated by reference, describes a system for generating and using interactive profile data associated with activity between a client and a server.

The personalised video generation system 2 also includes a number of render servers 10 for respective delivery platforms. The servers 10 receive video project files generated by the application server 4 and render corresponding video data from each file for delivery on the respective platform. The generated video data is processed by the distribution server 12 for transmission and delivery using respective delivery gateways 14 for the respective platforms. The platform and delivery gateways 14 include the following:

(i) Television. Commercial video messages for television may be delivered using a television gateway such as Adstream (terrestrial delivery or DubSAT (satellite delivery) 14. Delivery to these services involves "wrapping" the communication in standard test-pattern markers and tagging it with the details of the production facility and delivering the communication to a staging area by FTP (file transfer protocol). There are generally additional manual processes and approvals related to the delivery of television but the system 2 supports both manual and fully automated distribution to television production facilities.

(ii) In store. Video messages may be delivered on screens in retail stores. The video data can be distributed through a instore delivery gateway such as WorldNet or PodTV 14. Delivery generally involves file transfer to a staging area by FTP (file transfer protocol). An instore channel platform normally has its own software for targeted distribution and scheduling to its many and various instore output displays.

(iii) Email. The email render server 10 is able to produce emails for delivery to individuals with a video message, and this can be distributed by any email gateway, such as the eServices gateway 14 for rich content email using SMTP (Simple Mail Transfer Protocol)
(iv) Mobile. The render server 10 for the mobile platform is able to produce SMS or MMS messages for individuals and include a video message for that specific individual. Whilst SMS messages support text only, MMS messages support small static or moving image files. This is distributed to an SMS or MMS gateway, such as SMSCentral using SMTP (Simple Mail Transfer Protocol).
(v) SWF. The video data can be generated in a Shockwave Flash (SWF) format for streaming over a communications network, such as the Internet. The SWF files can be delivered for specific individuals using a video streaming gateway, such as the EdgePlatform content delivery gateway 14 by Akamai Technologies Inc. SWF files could also form the basis of email message sent to an email gateway 14.

The render servers 10 are G5 machines, produced by Apple Corporation, running video rending software such as Final Cut Pro, or may be PC servers running ActiveSWF by CPS Labs Ltd or Kinetic Fusion server software by Kinesis Software Ltd. ActiveSWF and Kinetic Fusion are able to generate SWF files from intermediary XML project file languages. The render servers 10 each include render engine components 230, 232 for controlling the respective video rendering tool, ie File Cut Pro or ActiveSWF. The render engine 230, 232 handles receipt of the video project files from the application server 4 and automatically attends to rendering and production of the video data for the required platform and communicates with the distribution server 12 to enable distribution. The distribution server 12 includes a distribution engine 240 for receiving the video data feeds and attending to distribution to the gateways 14 based on the delivery data included with the received video data. The delivery data includes transmission addresses for the gateways 14, and generated by the render engine, 230, 232. The render engines 230, 232 and the distribution engine 240 may be written in Java computer program code.

The system 2 also includes a tools and utilities component 250 which performs backup and recovery of the database and file storage server data and monitors all of the running processes of the system 2 for early fault detection.

The database server 6 stores non-linear editing (NLE) video project files which are tagged or marked in a specific manner to reference content items and procedure scripts. The procedure scripts (also referred to as "rules") are also stored in the database server 6 and are written in XML. The references or markers are included in the NLE files as null-effect or comment code so as not to disrupt the normal functional format of the NLE files. In other words, the tagged NLE files appear as normal NLE files to a video production tool, such as Final Cut Pro. For example, Apple Final Cut Pro defines an XML file format that includes optional comment code against each object:

```
:
<track>
    <clipitem>
        <name>lkwpus03a.jpg</name>
        <comments>
            <mastercomment1>Each of</mastercomment1>
                <mastercomment2>these can</mastercomment2>
            <mastercomment3>be a </mastercomment3>
                <mastercomment4>comment</mastercomment4>
        </comments>
:
```

QuickTime Pro by Apple uses a binary file format however this format can be modified by a Java API and Java can be marked as can XML. Avid Media Composer Adrenaline HD supports a transfer file format called MXF (Material Exchange Format) which allows content items or objects to be wrapped with metadata. AAF (Advanced Authoring Format) is a multimedia interchange file format that allows exchange of media between AAF compliant software applications. AAF allows for interchange of media data and metadata that describes each content item. Items and metadata within an AAF file can be modified by an AAF SDK (Software Development Kit).

The markers or references are inserted for respective content items and refer to externally located items or objects, executable commands or rules and/or the purpose of a communication or corresponding video, and a product or products. Based on the markers, the content of the video project file can then be grouped based on the purpose of the communication. Other group categories are also available, such as categories that are product related, target or recipient related, corporate related and other formal categories of content. Once the content items can be grouped or classified within a project file in this manner, the referenced content files can then be substituted as a group using the rules during rendering or by the campaign manager and content creation components, as described below. This is significantly distinct from previous time-based substitution techniques.

For example, a video message may include:
(i) global or common content that occurs throughout a video message;
(ii) top content that introduces a message, whether at the start or some other location of the message;
(iii) tail content that concludes the message, whether or not it occurs at the end of a message; and
(iv) dynamic content which repeatedly changes within the communication.

Whilst items of all of the above content can be changed using the markers, it may be that only the dynamic content needs to be changed for any given purpose of a communication. This may require product substitution for different content items across the dynamic content. The system 2 allows this to be done in a macro manner across the dynamic content without a user accessing individual content items or using a reference to time. The content can also be substituted by reference to personal data held in the CRM database 300.

The markers introduced by the null effect code are able to reference executable commands, performed by or under control of the rules, and the markers can dictate conditional executions to determine which item belongs in a marked location within the video project file. External commands can either be stored as a direct command or stored as a reference to external executable objects.

The tagged NLE files are processed by the content creation engine 202 which parses and recognises the markers and performs content item substitution or accesses the rule scripts for processing as instructed by the null effect code. The content creation engine 202 determines whether a marker refers to a direct or conditional replacement of content items. If the content engine 202 is unable to process the desired outcome, the engine 202 ensures a default outcome. This may involve using the current item on the marked file or the default may be externally specified by the marker.

The personal customer data 300 can be used to evaluate a conditional execution. For instance, the database 300 may store the following customer information:

| Name | Age | Income | Status |
|---|---|---|---|
| John Smith | 20 | 50000 | silver |
| Alicia Johns | 35 | 90000 | gold |
| Steven Kline | 18 | 30000 | gold |
| Brenda Nelson | 27 | 35000 | bronze |

The marker may reference a rule which determines the content to be substituted on the basis that a clip privilege.mov is inserted in the file if a person is aged between 18 and 25 and their income is above $40,000 or if their status is gold, otherwise an item default.mov is inserted. According to the example, the first three individuals would receive the privilege.mov clip in their video, but Brenda Nelson would not.

The campaign manager components 210, 200 described below allow the project files to be created, adjusted and stored. The dataloader 216 is used to store all of the required data on the system 2, and in particular seeds the DAM 220 with data. The dataloader 216 is used for loading brand, campaign, distribution, product, and content item data, rules and tagged NLE files onto the system. The dataloader 216 is also used to load and tag untagged NLE project files for use by the system 2. Once the tagged NLE files are prepared and the rule scripts adjusted as needed, the tagged files are passed to the content creation engine 202 using the content creation wizard 212. The content creation engine 202 processes the tagged files and applies the rules and performs all content substitution, based on the CRM data 300, in order to generate personal video project NLE files. For instance one tagged NLE file may generate 1,000,000 personalised NLE files based on the personal data 300. The personalised files then pass to the render servers 10 to render the video data. The video data is then distributed by the distribution server 12 using the gateways 14. Once the content creation engine 202 is invoked to generate the personal project files, their generation and rendering of the videos and distribution is completely automated.

An example of part of a tagged or marked NLE is provided in Appendix A which is a tagged Final Cut Pro project file for a test drive of a BMW Mini. Only parts of four pages are shown, as the actual tagged file is over 100 pages long. This shows how one clip item, cabrio_jump_orange.avi, is marked with null effect code so as to identify it as relating to a specific product. No rules are referenced for this clip item. For the clip item galleryimage50.jpeg, however, a CRM rule is referenced to obtain customer data and a group marking for an iPod nano product is also included. On the fourth page of Appendix A, XML code is shown which illustrates how a CRM rule is referenced for a content item (together with a product group identification) and how the processing result of the rule is specified in a parameter value to be used as text substitution. Appendix B includes a tagged SWF file, illustrating that the null effect code in this instance is not comment code, but instead object ID code is used to identify products. Appendix C includes an example of a rule script for determining a car dealer number for a video message, and Appendix D includes a CRM rule to determine what clip a customer receives. An example of the CRM data that the example tagged files utilise is shown in Appendix E. This is an example of a small list of targets for personalisation, and the format of the data and the actual data utilised can be dynamic and customisable based on the CRM rules used. As the CRM rules files are external to video project files that reference them, this allows the rules to be shared across different video project files.

Figure 4:
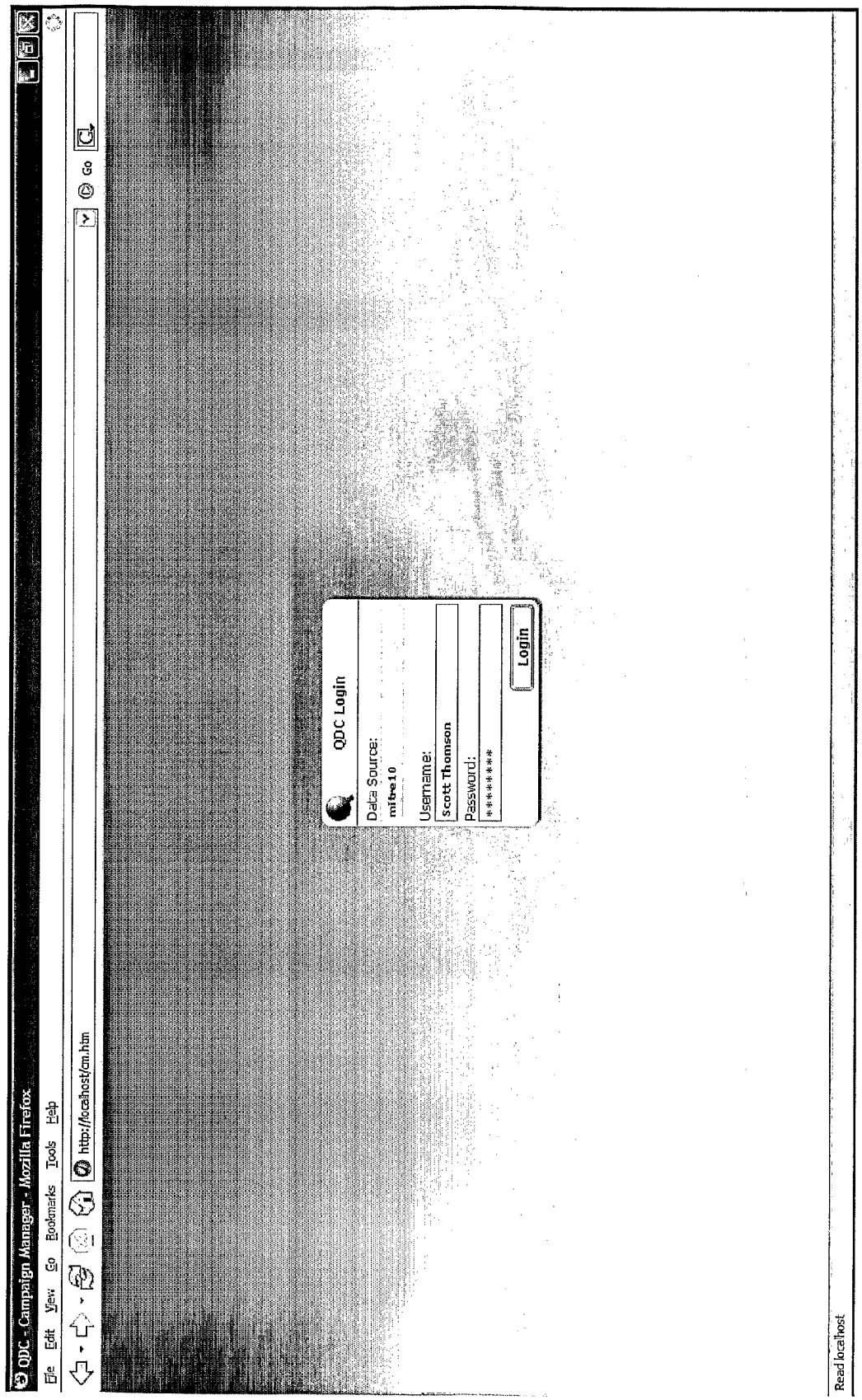
FIG. 4 is a screenshot of a login interface display produced by the system.
Figure 5:
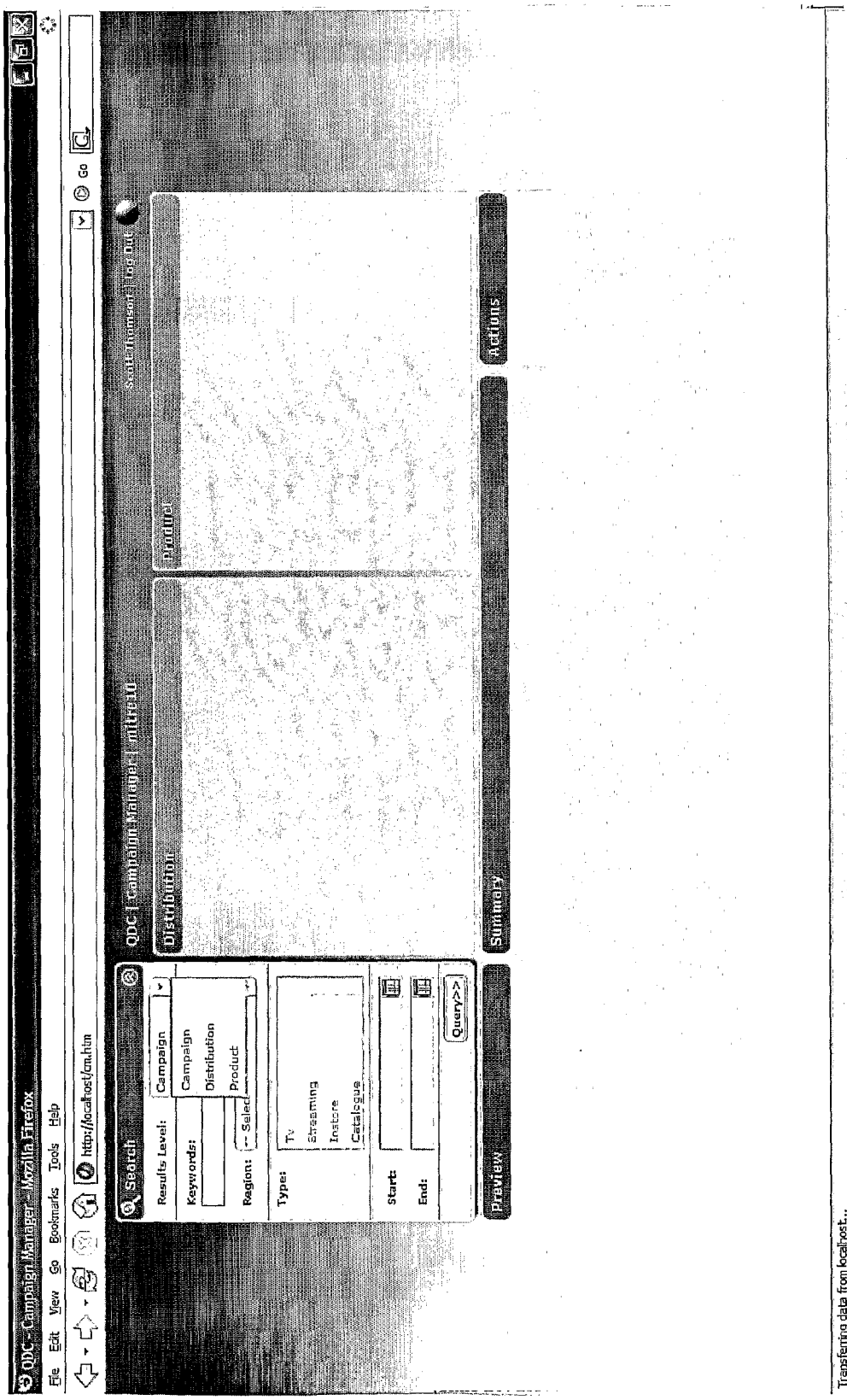
FIG. 5 is a screenshot of a search interface display produced by the system.

The campaign manager client 210 initially generates for a user a login screen, as shown in FIG. 4, allowing users to specify a data source for the DAM 220 and a username password combination to gain access to the application server 4. The data source may be that belonging to a particular company or customer for which the video messages are to be prepared. Once the user is authenticated, the campaign manager 200, 210, initially provides a search interface, as shown in FIG. 5, whereby video project file templates maintained by the DAM 220 can be searched based on the data stored for the templates. Results can be displayed based on whether the user wishes to review the message campaigns, the distribution mediums or particular products.

Figure 6:
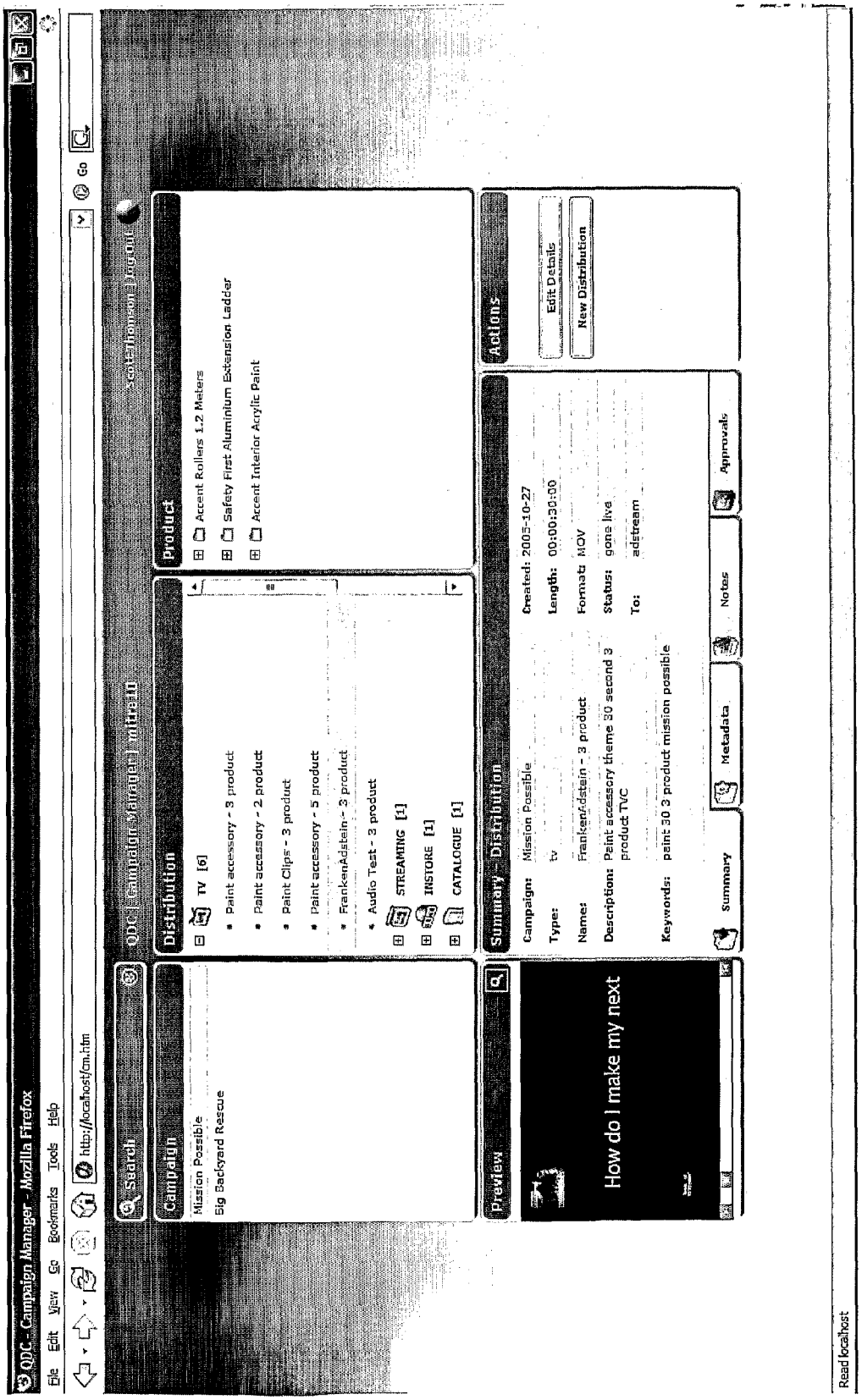
FIG. 6 is a screenshot of a campaign manager interface display produced by the system.

The main interface of the campaign manager 200, 210 is shown in the display of FIG. 6. This includes three main window panes for campaign, distribution and product. The panes are hierarchical, in that each campaign may contain a number of distribution versions where each version is a specific communication sent out at a certain date and time. A campaign is an overall advertising or messaging project. A campaign can be selected in the campaign pane, eg "Mission Impossible" and then the distribution pane will display any or all distributions sent in the campaign in an hierarchical tree structure grouped by the type of distribution that was sent (be that TV, instore, Email, Mobile or SWF). The distributions are then selectable to see what products or entities were advertised in the distribution. For example, in the distribution pane a certain distribution can be selected, eg "FrankAdstein" which contains three products, and then the product pane will then display the three relevant products that are to be advertised in that particular message. The selected video message in the distribution pane, eg "FrankAdstein" can then be previewed in a preview window pane, where the message can be played. Another information pane provides access to any data associated with the selected message, and this can be viewed by selected summary, metadata, notes and approval tabs which display selected elements of the data for the message. An actions window pane allows displayed commands to be invoked, such as creating a new distribution for a selected message. The campaign manager 200, 210, as shown with reference to FIG. 6, provides access to video messages that have been marked so as to be grouped according to campaign, distribution platform or product. By using the actions pane to select the new distribution command, this invokes the content creation wizard 212 to provide access to the content creation engine 202.

Figure 7:
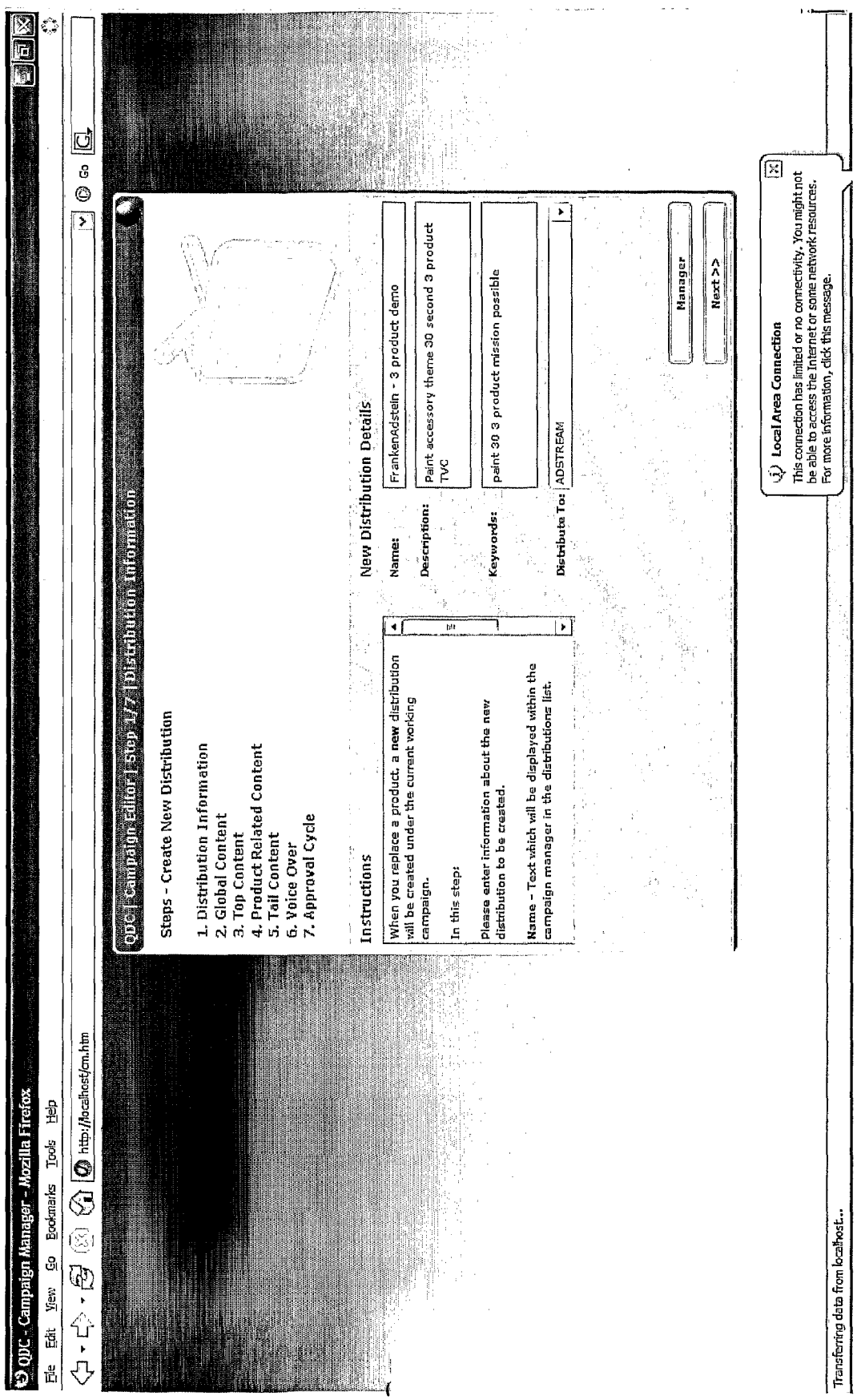
FIG. 7 is a screenshot of a distribution selection content creation interface display produced by the system.

The content creation wizard 212 guides users through up to seven or more process steps, as shown in FIG. 7 for a selected message, in this case the FrankAdstein message. In the first step details concerning the distribution are provided to the user, including the name of the message, brief description of it, metadata keywords and the distribution platform that is to be used. Instructions are also provided to the user. The content creation wizard 212 allows users to view and edit, at each of the subsequent five process steps, the global content, the top content, the product related content, which is generally dynamic, the tail content, and an overall voice over and general audio. The final step is an approval process before the content creation engine 202 parses the completed tagged NLE file.

Figure 8:
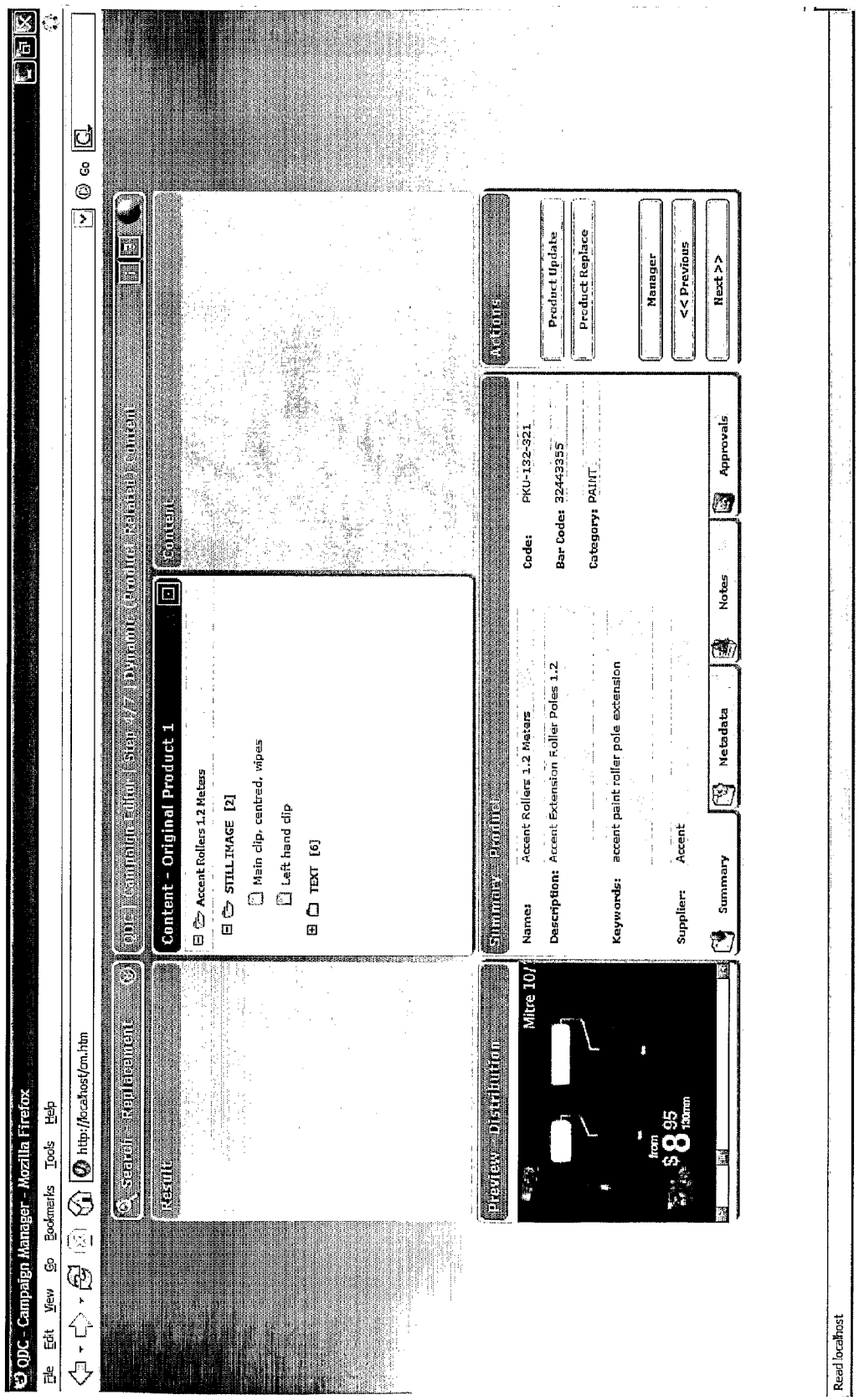
FIG. 8 is a screenshot of a first dynamic product content creation interface display produced by the system.
Figure 9:
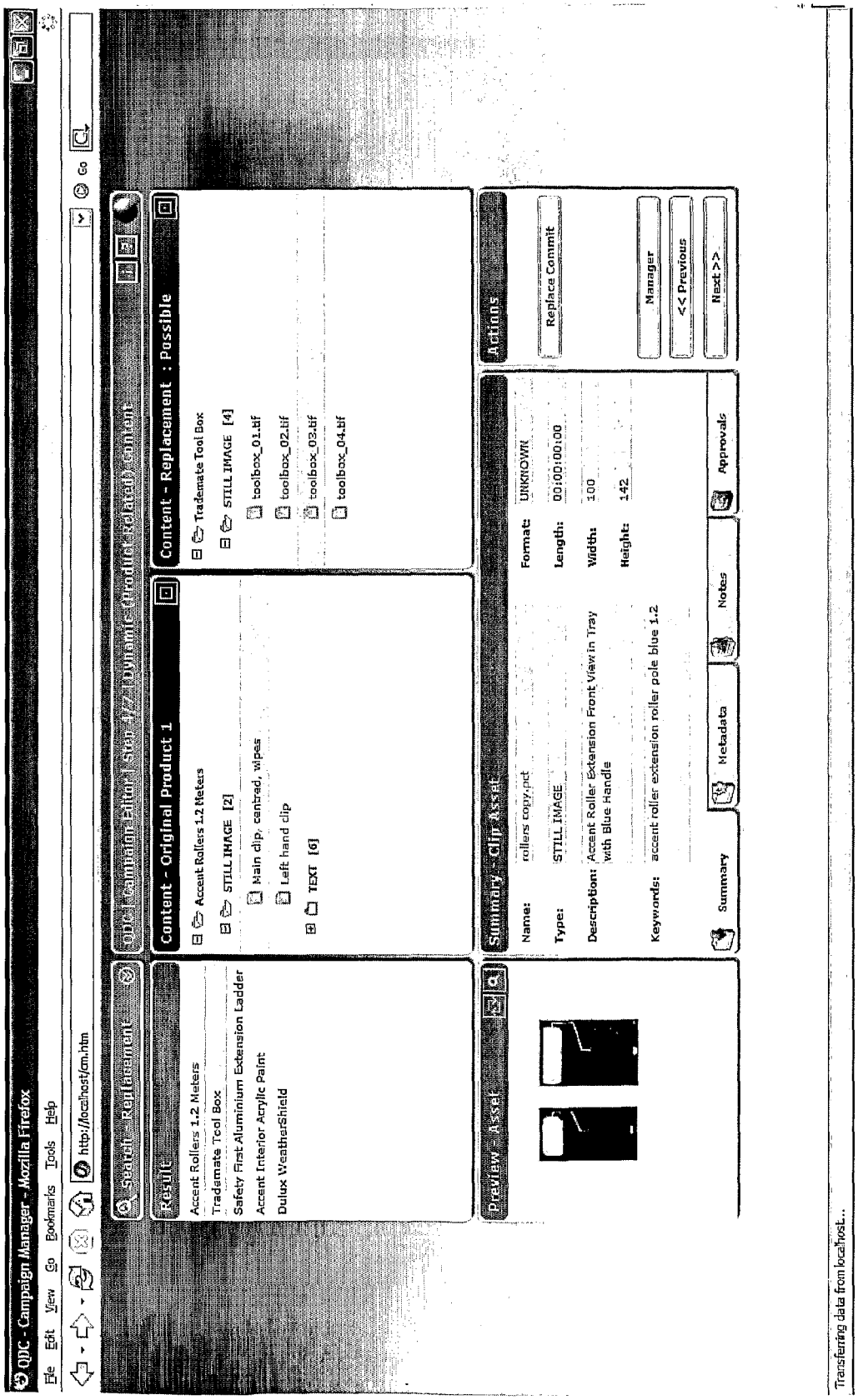
FIG. 9 is a screenshot of a second dynamic product content creation interface display produced by the system.
Figure 10:
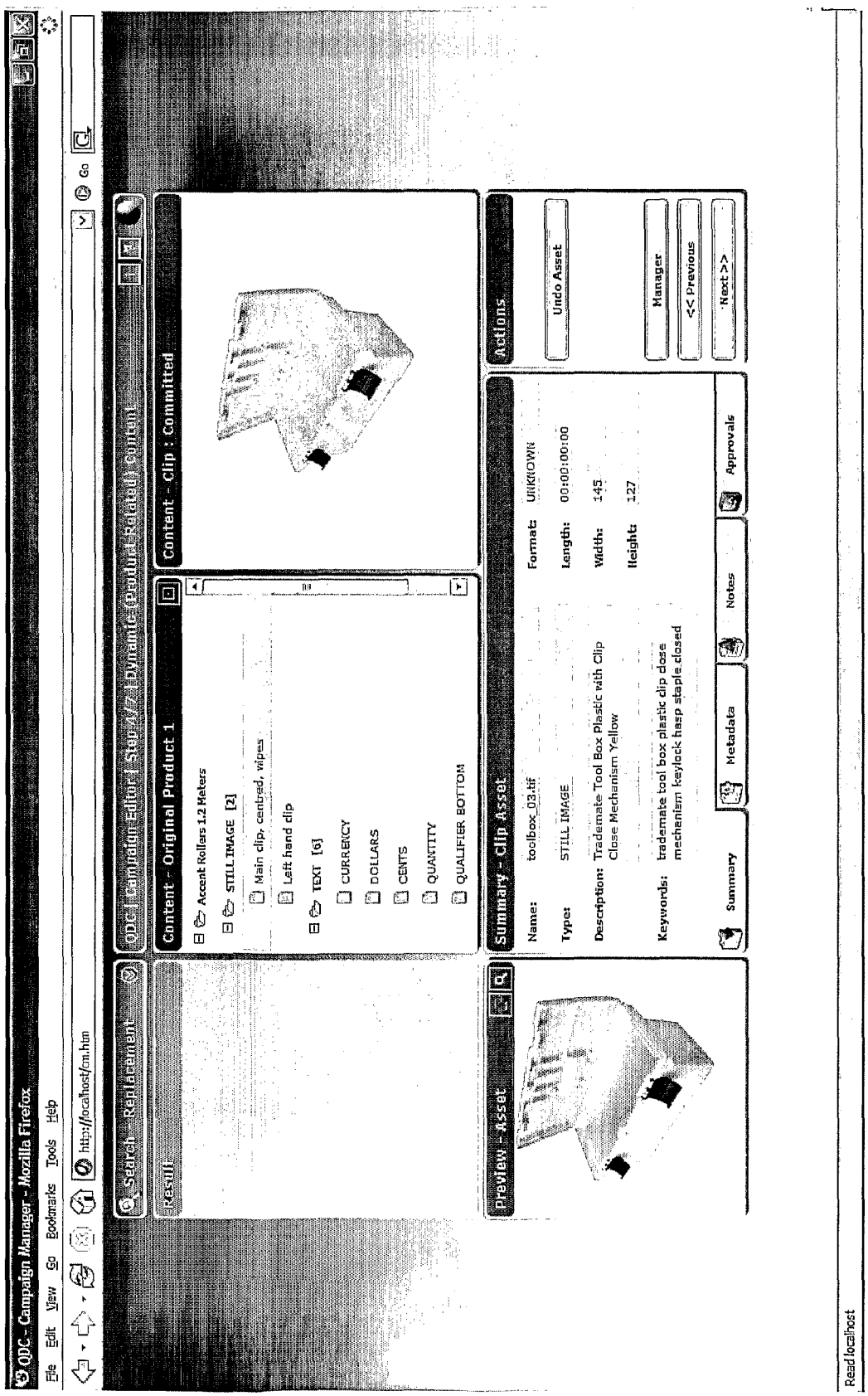
FIG. 10 is a screenshot of a third dynamic product content creation interface display produced by the system.

For each content edit process step, as shown in FIG. 8 for the dynamic product related content, the wizard 212 provides again a tree structure grouped view of the content, based on the group tag data. In this case, the FrankAdstein message is for three products and any one of the three can be selected from a content pane of the interface. Once one is selected, as shown in FIG. 8 called the Accent Rollers, the hierarchical view can be expanded to show the content components that have been grouped for that particular product. In this case there are two still images and six text items. Any one of the grouped content items can be selected and then replaced across the entirety of the message. For example, the main roller still image may appear at a number of locations throughout the video message and specified by a reference to the main clip throughout the video project file. The marked video project file can be adjusted automatically in each location to insert a different product, i.e. a content item for a different product. The content items can also be substituted by processing of the rules during the parsing process. As shown in FIG. 9, the main still image clip for the first product can be selected for replacement with images associated with another product. The interface allows other products to be searched for in a second replacement pane to locate their grouped content components. For example, as shown in FIG. 9, the Trademate tool box has been selected in the search results and a content replacement window pane displays in the tree structure hierarchy the available content items for that product. Selecting one of the still image items causes the preview pane to display that image and the information window pane allows tabbed views of the data for the selected image. The actions pane allows corresponding commands to be invoked, such as committing to the replacement. If this is done, then the result is displayed by the wizard 212, as shown in FIG. 10, with the main clip item highlighted and an image of substituted clip displayed in the right hand content window pane, again with a preview available and macro and micro views of the data in the information window pane. The actions window pane allows the change to be reversed by invoking an undo asset command. If the change is committed to, then the marked video project file is adjusted so that all references to the previous clip for the rollers are replaced with reference to a still image clip for the toolbox. Similarly the grouped text data regarding the product can also be changed such as the relevant currency, dollars and cents equivalent units, and quantity (each, per dozen etc) or qualifiers such as "Monday Only" or "Now Just . . . ".

Figure 11:
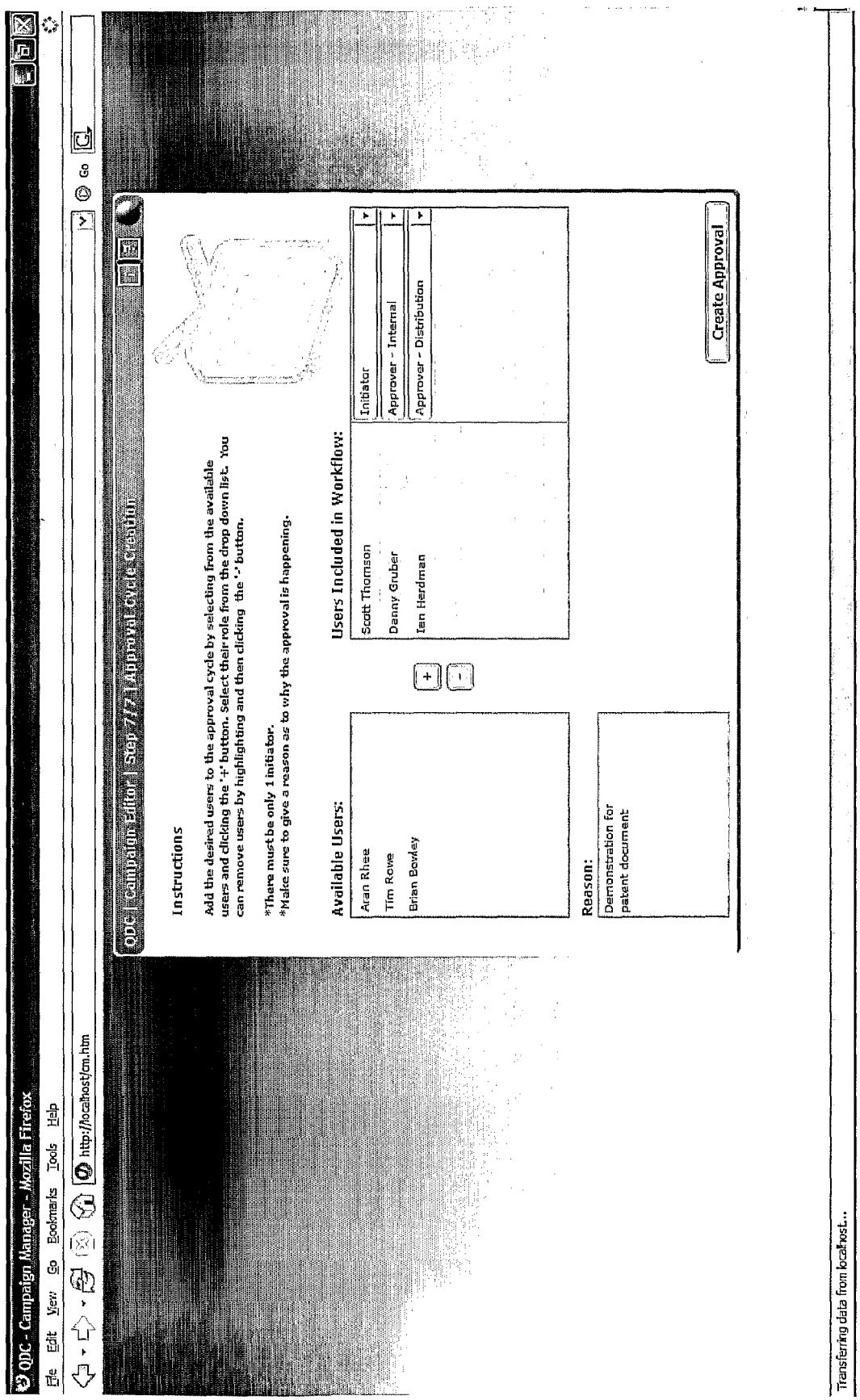
FIG. 11 is a screenshot of an approvals client interface display produced by the system.

Once all the elements associated with the tagged NLE file corresponding to the message have been viewed using the content creation wizard, then the final process step involves adjusting the approvals required, as shown in FIG. 11, before the message files are produced for the render servers 10. The approval client 214 allows a user to specify who is the initiator/requestor of the render request, who will approve the output over various stages of production, who will attend to any manual changes if so required, the overall project owner, who will ultimately approve the final distribution and any other party, such as a customer, who may wish to track the production procedure. The approval client 214 is used to define privilege or access levels for individual users of the system 2 that are maintained by the approval manager 204.

Figure 12:
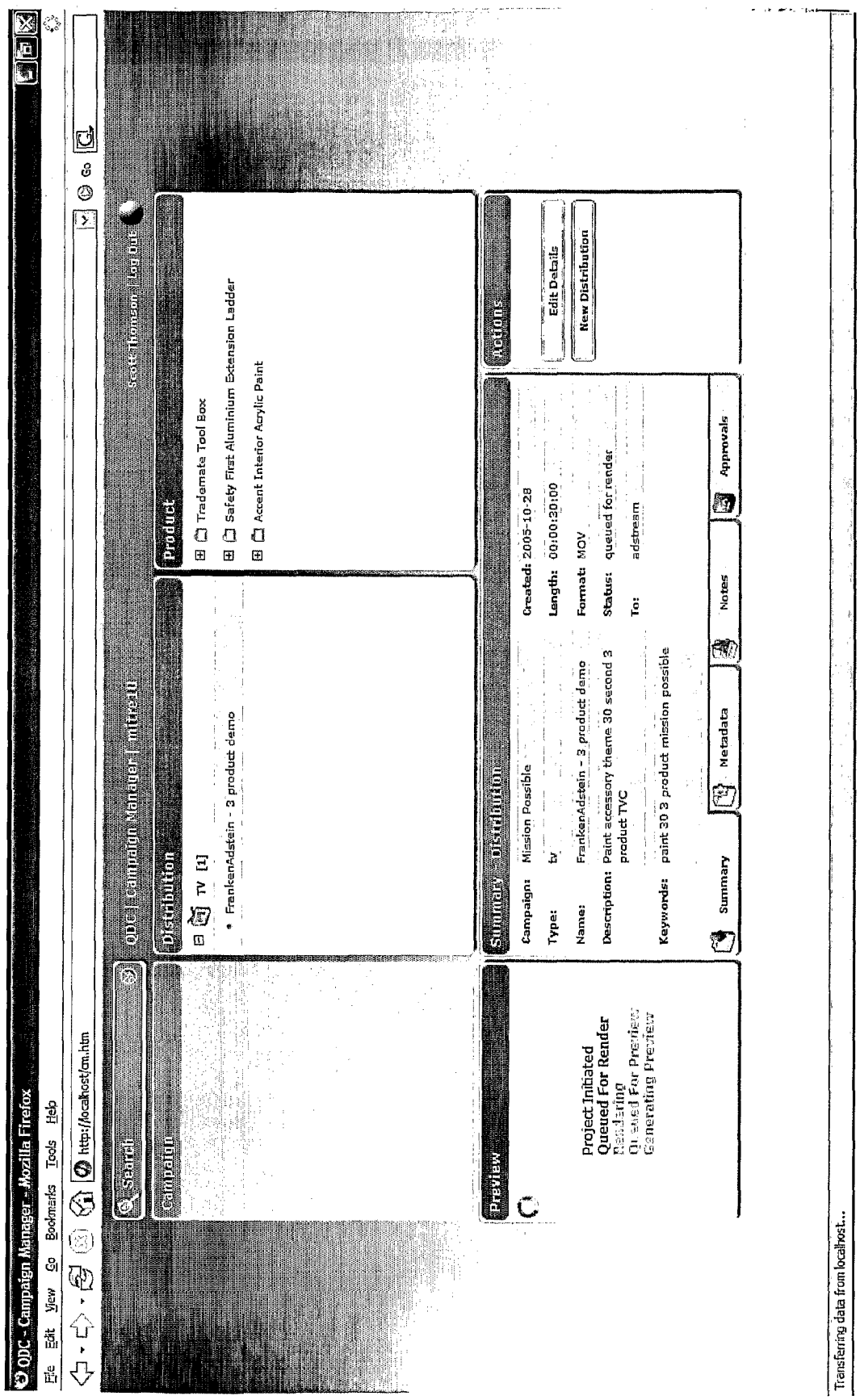
FIG. 12 is a screenshot of a render status interface display produced by the system.

Once the necessary approval is received by the system 2, the content creation engine 202 processes the tagged NLE file for the message and the status of the render process for the message is displayed for the user by the content creation wizard 212 in the preview pane, as shown in FIG. 12. The content items referenced by the tagged file are accessed by the DAM 220 for the persons or groups of persons intended to receive the message. The number of video project files that are generated by the content creation engine 202 (and passed to the render engines 230, 232, for rendering the video messages) will, as discussed previously, depend on the personal recipient data accessed by the DAM 220 during the creation process.

Once the tagged project files have been produced for a particular campaign, the rendering process to create and distribute the content can be commenced or triggered by a number of events. For example, client and server activity can be monitored using an agent, as discussed in Australian Patent Application 2006906092, to determine when content generation should be triggered. Video generation and distribution can also be triggered simply based on a person browsing to a predetermined location of a web site. Location base triggers can also be employed. For example, distribution can be made to a mobile telephone when it is determined that a user of the phone is within or at a certain location or region. Similarly if a device includes a RFID tag and is able to receive a distribution, content generation and distribution to that device may be triggered when the tag is detected at a specific location.

Tagged project files may also be used which comprise primarily or entirely references to rules to determine the content to be delivered. Classes of rules can be developed to define criteria for generating content. A rule class may include one or more rules to define a predetermined criteria. One or more prioritised criteria can then be included in a project file so as to provide a rules set. The criteria is prioritised on the basis of the sequence in which they are first considered. For example, once a first criteria is satisfied and leads to a result, then the second criteria does not need to be processed. The criteria and rules classes can then be edited and prioritised using a campaign manager interface. A campaign may then be defined by one rule set of a project file. Content generation can also be defined and edited based on an extended hierarchy having the following levels: brand, campaign, distribution, products and assets (being content items). The levels could have applied thereto different aspects of the rule hierarchy, being rules set, criteria (rule classes) and rules.

The video generation system 2 provides a system for personalising and versioning video messages for automatic rendering and delivery on a wide variety of delivery platforms. The system removes the constraints of time based video editing tools such that an advertising manager with no professional editing skills can simply repurpose or edit messages for delivery. The system allows for group based replacement of content within an NLE video project file, even down to a specific replacement for communication to an individual based on personal or CRM data.

Many modifications will be apparent to those skilled in the art without departing from the scope of the present invention as herein described with reference to the accompanying drawings.

APPENDIX A

```
<?xml version="1.0" encoding="UTF-8" ?>
<!DOCTYPE xmeml (View Source for full doctype...)>
- <xmeml version="1">
- <sequence id="mini_Jump">
    <name>mini_Jump</name>
    <duration>604</duration>
  - <rate>
      <ntsc>TRUE</ntsc>
      <timebase>30</timebase>
    </rate>
  - <timecode>
  - <rate>
      <ntsc>TRUE</ntsc>
      <timebase>30</timebase>
    </rate>
    <string>01:00:00;00</string>
    <frame>107892</frame>
    <source>source</source>
    <displayformat>DF</displayformat>
  </timecode>
  <in>-1</in>
  <out>-1</out>
- <media>
- <video>
```

APPENDIX A-continued

```xml
- <format>
- <samplecharacteristics>
    <width>720</width>
    <height>480</height>
    <anamorphic>FALSE</anamorphic>
    <pixelaspectratio>Square</pixelaspectratio>
    <fielddominance>none</fielddominance>
- <rate>
    <ntsc>TRUE</ntsc>
    <timebase>30</timebase>
  </rate>
  <colordepth>24</colordepth>
- <codec>
    <name>Apple DV - NTSC</name>
- <appspecificdata>
    <appname>Final Cut Pro</appname>
    <appmanufacturer>Apple Computer, Inc.</appmanufacturer>
    <appversion>5.0</appversion>
- <data>
- <qtcodec>
    <codecname>Apple DV - NTSC</codecname>
    <codectypename>DV - NTSC</codectypename>
    <codectypecode>dvc</codectypecode>
    <codecvendorcode>appl</codecvendorcode>
    <spatialquality>1023</spatialquality>
    <temporalquality>0</temporalquality>
    <keyframerate>0</keyframerate>
    <datarate>0</datarate>
  </qtcodec>
  </data>
  </appspecificdata>
  </codec>
  </samplecharacteristics>
- <appspecificdata>
    <appname>Final Cut Pro</appname>
    <appmanufacturer>Apple Computer, Inc.</appmanufacturer>
    <appversion>5.0</appversion>
- <data>
- <fcpimageprocessing>
    <useyuv>TRUE</useyuv>
    <usesuperwhite>FALSE</usesuperwhite>
    <rendermode>YUV8BPP</rendermode>
  </fcpimageprocessing>
  </data>
  </appspecificdata>
  </format>
- <track>
- <clipitem id="cabrio_jump_orange.avi">
    <name>Cooper S Convertible</name>
    <duration>907</duration>
- <rate>
    <ntsc>TRUE</ntsc>
    <timebase>30</timebase>
  </rate>
  <in>0</in>
  <out>84</out>
  <start>0</start>
  <end>84</end>
  <pixelaspectratio>Square</pixelaspectratio>
  <enabled>TRUE</enabled>
  <anamorphic>FALSE</anamorphic>
  <alphatype>none</alphatype>
  <masterclipid>cabrio_jump_orange.avi1</masterclipid>
- <logginginfo>
    <scene />
    <shottake />
    <lognote />
    <good>FALSE</good>
  </logginginfo>
- <labels>
    <label2 />
  </labels>
- <comments>
    <mastercomment1 />
    <mastercomment2 />
    <mastercomment3 />
    <mastercomment4>PRODUCT#1-Mini Cabrio</mastercomment4>
  </comments>
- <file id="cabrio_jump_orange">
    <name>cabrio_jump_orange.avi</name>
    <pathurl>file://localhost/mini/vol/1/12_0.avi</pathurl>
- <rate>
    <timebase>25</timebase>
  </rate>
  <duration>756</duration>
  .
  .
  .
  </filter>
- <sourcetrack>
    <mediatype>video</mediatype>
  </sourcetrack>
  </generatoritem>
- <clipitem id="galleryimage50.jpg">
    <name>iPod Nano</name>
    <duration>3901</duration>
- <rate>
    <ntsc>TRUE</ntsc>
    <timebase>30</timebase>
  </rate>
  <in>2081</in>
  <out>2121</out>
  <start>319</start>
  <end>359</end>
  <pixelaspectratio>Square</pixelaspectratio>
  <stillframe>TRUE</stillframe>
  <enabled>TRUE</enabled>
  <anamorphic>FALSE</anamorphic>
  <alphatype>none</alphatype>
- <logginginfo>
    <scene />
    <shottake />
    <lognote />
    <good>FALSE</good>
  </logginginfo>
- <labels>
    <label2 />
  </labels>
- <comments>
    <mastercomment1 />
    <mastercomment2 />
    <mastercomment3>CRMRULE#0</mastercomment3>
    <mastercomment4>PRODUCT#2-iPod Nano</mastercomment4>
  </comments>
- <file id="galleryimage50">
    <name>galleryimage50.jpg</name>
    <pathurl>file://localhost/mini/vol1/1/13_0.jpg</pathurl>
- <rate>
    <timebase>30</timebase>
    <ntsc>TRUE</ntsc>
  </rate>
  <duration>2</duration>
  <width>1440</width>
  <height>900</height>
- <media>
- <video>
    <duration>2</duration>
    <stillframe>TRUE</stillframe>
- <samplecharacteristics>
    <width>1440</width>
    <height>900</height>
  </samplecharacteristics>
  .
  .
  .
  </logginginfo>
- <labels>
    <label2 />
  </labels>
- <comments>
    <mastercomment1 />
    <mastercomment2 />
    <mastercomment3>CRMRULE#83</mastercomment3>
    <mastercomment4>PRODUCT#1-How to Enter</mastercomment4>
  </comments>
- <effect>
    <name>Text</name>
    <effectid>Text</effectid>
    <effectcategory>Text</effectcategory>
    <effecttype>generator</effecttype>
```

APPENDIX A-continued

```
<mediatype>video</mediatype>
- <parameter>
    <parameterid>str</parameterid>
    <name>Text</name>
    <value>REPLY SMS OR CALL CRMRULE#83</value>
  </parameter>
```

APPENDIX A-continued

```
- <parameter>
    <parameterid>fontname</parameterid>
    .
    .
    .
```

APPENDIX B

```
- <movie width="500" height="370" frameRate="31" bgColor="black" SWFVersion="7" compressed="true">
- <styles>
    <lineStyle id="lineBlack" color="#000000" width="1" />
    <lineStyle id="lineRed" color="#FF0000" width="1" />
    <lineStyle id="lineMiniRed" color="red" width="10" />
    <lineStyle id="lineMiniBlue" color="blue" width="10" />
    <solidFillStyle id="none" color="#000000" alpha="0" />
    <solidFillStyle id="fillBlack" color="#000000" />
  </styles>
- <objects>
- <htmlText id="PRODUCT_1_Screen1Txt_CRMMETA_firstName" x="5" y="280" width="500" height="100" color="#FFFFFF" fontSize="20" font="Arial" multiline="true" indent="5" wordWrap="true">
        - <![CDATA[
          <p align="center"><b>Hi <font color="#FF0000">CRMMETA_firstName</font></b></p>
                    <p align="center"><b>before your next big caper...</b></p>
        ]]>
  </htmlText>
- <htmlText id="PRODUCT_1_Screen2Txt_CRMMETA_model" x="5" y="280" width="500" height="100" color="#FFFFFF" fontSize="20" font="Arial" multiline="true" indent="5" wordWrap="true">
        - <![CDATA[
          <p align="center"><b>Don't forget to get your</b></p>
                    <p align="center"><b><font color="#FF0000">CRMMETA_model </font>serviced!</b></p>
        ]]>
  </htmlText>
- <htmlText id="PRODUCT_1_Screen3Txt_CRMMETA_kms" x="5" y="280" width="500" height="100" color="#FFFFFF" fontSize="20" font="Arial" multiline="true" indent="5" wordWrap="true">
        - <![CDATA[
          <p align="center"><b>It's now due for a</b></p>
                    <p align="center"><b><font color="#FF0000">CRMMETA_kms km </font>service</b></p>
        ]]>
  </htmlText>
- <htmlText id="PRODUCT_1_Screen4Txt_CRMRULE_82" x="5" y="280" width="500" height="100" color="#FFFFFF" fontSize="20" font="Arial" multiline="true" indent="5" wordWrap="true">
        - <![CDATA[
          <p align="center"><b>Book now with </b></p>
                    <p align="center"><b><font color="#FF0000">CRMRULE_82</font></b></p>
        ]]>
  </htmlText>
- <htmlText id="PRODUCT_1_Screen5Txt_CRMRULE_83" x="-5" y="280" width="500" height="100" color="#FFFFFF" fontSize="20" font="Arial" multiline="true" indent="5" wordWrap="true">
        - <![CDATA[
          <p align="center"><b> Call <font color="#FF0000">CRMRULE_83</font></b></p>
                    <p align="center"><b>Let's Mini!</b></p>
        ]]>
  </htmlText>
  <image id="PRODUCT_1_7_20_service1" src="http://localhost/mini/vol1/1/20_0.png" x="5" y="5" width="490" height="255" jpegQuality="75" />
  <image id="PRODUCT_1_7_22_service2" src="http://localhost/mini/vol1/1/22_0.png" x="5" y="5" width="490" height="255" jpegQuality="75" />
  <image id="PRODUCT_1_7_28_service3" src="http://localhost/mini/vol1/1/28_0.png" x="5" y="5" width="490" height="255" jpegQuality="75" />
  <image id="PRODUCT_1_7_24_service4_CRMRULE_81" src="http://localhost/mini/vol1/1/24_0.png" x="5" y="5" width="490" height="255" jpegQuality="75" />
```

APPENDIX B-continued

```xml
<image id="MiniLogo" src="http://localhost/mini/vol1/1/18_0.png"
x="133" y="90" width="235" height="100" jpegQuality="75" />
  <rectangle id="blackRect" x="0" y="0" width="500" height="320"
lineStyle="lineBlack" fillStyle="fillBlack" />
- <sprite id="qdcSizeSprite">
- <styles>
    <lineStyle id="sLineBlack" color="#000000" width="0" />
    <solidFillStyle id="sFillBlack" color="#000000" />
  </styles>
- <objects>
    <rectangle id="Background" x="0" y="0" width="500" height="370"
lineStyle="sLineBlack" fillStyle="sFillBlack" />
  </objects>
- <layers>
- <layer>
- <frame index="0">
    <show objectId="Background" id="showBG" />
  </frame>
  <frame index="770" />
  </layer>
  </layers>
  </sprite>
- <morph id="morph1">
    <rectangle id="rect" x="-150" y="-120" width="500" height="320"
lineStyle="lineMiniRed" fillStyle="none" />
    <rectangle id="rect" x="0" y="-60" width="500" height="320"
lineStyle="lineMiniRed" fillStyle="none" />
  </morph>
- <morph id="morph2">
    <rectangle id="rect" x="-100" y="60" width="500" height="330"
lineStyle="lineMiniBlue" fillStyle="none" />
    <rectangle id="rect" x="-10" y="5" width="500" height="330"
lineStyle="lineMiniBlue" fillStyle="none" />
  </morph>
- <morph id="morph3">
    <rectangle id="rect" x="0" y="-120" width="500" height="320"
lineStyle="lineMiniRed" fillStyle="none" />
    <rectangle id="rect" x="0" y="-60" width="500" height="320"
lineStyle="lineMiniRed" fillStyle="none" />
  </morph>
- <morph id="morph4">
    <rectangle id="rect" x="100" y="60" width="500" height="330"
lineStyle="lineMiniBlue" fillStyle="none" />
    <rectangle id="rect" x="-10" y="5" width="500" height="330"
lineStyle="lineMiniBlue" fillStyle="none" />
  </morph>
- <morph id="morph5">
    <rectangle id="rect" x="150" y="-120" width="500" height="320"
lineStyle="lineMiniRed" fillStyle="none" />
    <rectangle id="rect" x="0" y="-60" width="500" height="320"
lineStyle="lineMiniRed" fillStyle="none" />
  </morph>
- <morph id="hide">
    <square id="square" x="0" y="0" size="0" lineStyle="lineRed" fillStyle="none" />
    <square id="square" x="0" y="0" size="0" lineStyle="lineRed" fillStyle="none" />
  </morph>
  <sound id="mySong" src="http://localhost/mini/vol1/1/30_0.wav"
mp3Quality="32" />
  </objects>
- <layers>
- <layer>
- <frame index="0">
    <startSoundStream objectId="mySong" trimFrames="770" />
    <show objectId="qdcSizeSprite" id="qdcBG" />
    <show objectId="PRODUCT_1_Screen1Txt_CRMMETA_firstName"
id="showHtmlText1" />
    <show objectId="PRODUCT_1_7_20_service1" id="showService1"
morphFrames="220" />
    <show objectId="morph1" id="showMorph1" morphFrames="220" />
  </frame>
- <frame index="220">
    <hide showId="showMorph1" />
    <hide showId="showService1" />
    <hide showId="showHtmlText1" />
    <show objectId="PRODUCT_1_Screen2Txt_CRMMETA_model"
id="showHtmlText2" />
    <show objectId="PRODUCT_1_7_22_service2" id="showService2"
morphFrames="100" />
```

APPENDIX B-continued

```xml
    <show objectId="morph2" id="showMorph2" morphFrames="100" />
  </frame>
- <frame index="320" />
    <hide showId="showMorph2" />
    <hide showId="showService2" />
    <hide showId="showHtmlText2" />
    <show objectId="PRODUCT_1_Screen3Txt_CRMMETA_kms"
id="showHtmlText3" />
    <show objectId="PRODUCT_1_7_28_service3" id="showService3"
morphFrames="100" />
    <show objectId="morph3" id="showMorph3" morphFrames="100" />
  </frame>
- <frame index="420">
    <hide showId="showMorph3" />
    <hide showId="showService3" />
    <hide showId="showHtmlText3" />
    <show objectId="PRODUCT_1_Screen4Txt_CRMRULE_82"
id="showHtmlText4" />
    <show objectId="PRODUCT_1_7_24_service4_CRMRULE_81"
id="showService4" morphFrames="100" />
    <show objectId="morph4" id="showMorph4" morphFrames="100" />
  </frame>
- <frame index="520">
    <hide showId="showMorph4" />
    <hide showId="showService4" />
    <hide showId="showHtmlText4" />
    <show objectId="blackRect" id="showBlackRect" morphFrames="230" />
    <show objectId="MiniLogo" id="showMiniLogo" />
    <show objectId="PRODUCT_1_Screen5Txt_CRMRULE_83"
id="showHtmlText6" />
  </frame>
- <frame index="770">
    <stopSound objectId="mySong" />
- <actions>
    <actionStop />
  </actions>
  </frame>
  </layer>
  </layers>
  </movie>
```

APPENDIX C

```xml
<?xml version="1.0" encoding="UTF-8" standalone="yes" ?>
<crmRuleSet>
  <crmRule>
    <crmRuleClause>
      <crmRuleElement>
        <category>INRANGE</category>
        <attribute>postcode</attribute>
        <operator>IN_RANGE</operator>
        <attrval>3180</attrval>
        <attrval>3189</attrval>
        <attrval>true</attrval/>
      </crmRuleElement>
    </crmRuleClause>
    <text>(03) 9524 4000</text>
  </crmRule>
  <crmRule>
    <crmRuleClause>
      <crmRuleElement>
        <category>INRANGE</category>
        <attribute>postcode</attribute>
        <operator>IN_RANGE</operator>
        <attrval>3150</attrval>
        <attrval>3159</attrval>
        <attrval>true</attrval>
      </crmRuleElement>
    </crmRuleClause>
    <text>(03) 8848 2222</text>
  </crmRule>
  <crmRule>
    <crmRuleClause>
      <crmRuleElement>
        <category>INRANGE</category>
        <attribute>postcode</attribute>
        <operator>IN_RANGE</operator>
```

APPENDIX C-continued

```xml
        <attrval>3120</attrval>
        <attrval>3129</attrval>
        <attrval>true</attrval>
      </crmRuleElement>
    </crmRuleClause>
    <text>(03) 8530 2121</text>
  </crmRule>
  <crmRule>
    <crmRuleClause>
      <crmRuleElement>
        <category>INRANGE</category>
        <attribute>postcode</attribute>
        <operator>IN_RANGE</operator>
        <attrval>3140</attrval>
        <attrval>3149</attrval>
        <attrval>true</attrval>
      </crmRuleElement>
    </crmRuleClause>
    <text>(03) 8699 4888</text>
  </crmRule>
  <text>(03) 8699 4888</text>
</crmRuleSet>
```

APPENDIX D

```xml
<?xml version="1.0" encoding="UTF-8" standalone="yes" ?>
<crmRuleSet>
  <crmRule>
    <crmRuleClause>
      <crmRuleElement>
        <category>ALPHA</category>
        <attribute>sex</attribute>
```

APPENDIX D-continued

```
        <operator>EQUALS</operator>
        <attrval>male</attrval>
      </crmRuleElement>
    </crmRuleClause>
    <assetID>26</assetID>
  </crmRule>
  <crmRule>
    <crmRuleClause>
      <crmRuleElement>
        <category>ALPHA</category>
        <attribute>sex</attribute>
        <operator>EQUALS</operator>
        <attrval>female</attrval>
      </crmRuleElement>
    </crmRuleClause>
    <assetID>24</assetID>
  </crmRule>
  <assetID>26</assetID>
</crmRuleSet>
```

APPENDIX E

| ID | First Name | Last Name | Sex | Model | Kms | Post-code |
|----|------------|-----------|---------|----------|---------|------|
| 1 | Tim | Rowe | male | Cooper S | 40,000 | 3153 |
| 2 | Erica | Espinoza | female | Cooper | 20,000 | 3000 |
| 3 | Aran | Rhee | male | Cabrio S | 80,000 | 3145 |
| 4 | Danny | Gruber | male | Chilli | 60,000 | 3183 |
| 5 | Scott | Thomson | unknown | Chilli S | 100,000 | 3124 |
| 6 | Ian | Herdman | male | Cabrio S | 60,000 | 3124 |
| 7 | Renny | Seears | male | Cabrio | 100,000 | 3141 |
| 8 | Bjorn | Schultheiss | male | Cooper S | 100,000 | 3141 |

The invention claimed is:

1. A personalised video generation system, including:
a digital asset manager configured to store a first video project file marked with references to:
  (i) content item data defining respectively content items, including at least one of clip, audio and text items, for access;
  (ii) content group data defining respectively one or more content groups for the content items; and
  (iii) rule data defining respectively content substitution rules for access;
an editing tool configured to access said first file, display content items referenced by said first file based on said groups, generate a graphic user interface for substituting said references to content item data across said file based on said groups, and adjust said references for said digital asset manager; and
a content generation engine configured to process said file and said rules, based on personal data of intended recipients, by parsing said first video project file and accessing said rules based on said rule data to generate a plurality of second video project files for rendering as corresponding videos for said recipients, wherein said rules operate on said personal data to determine content items to be referenced in the plurality of second video project files.

2. A system as claimed in claim 1, wherein said content groups correspond to products.

3. A system as claimed in claim 1, wherein said content groups correspond to a purpose of the videos.

4. A system as claimed in claim 1, wherein said clip items include at least one static image.

5. A system as claimed in claim 1, wherein said clip items include moving image sequences.

6. A system as claimed in claim 1, wherein the editing tool includes a campaign manager for accessing and adjusting first video project files grouped based on a selected one of campaign, distribution and product.

7. A system as claimed in claim 1, wherein the editing tool includes a content creation tool for accessing and adjusting said references in a first video project file on the basis of a product corresponding to at least one of said content groups.

8. A system as claimed in claim 1, wherein the editing tool generates interfaces for accessing and editing said references on a hierarchical basis from campaign, distribution, product to content items.

9. A system as claimed in claim 1, wherein said personal data includes customer relationship management (CRM data obtained from a CRM database.

10. A system as claimed in claim 1, wherein said personal data includes profile data generated from social network data associated with a person.

11. A system as claimed in claim 1, wherein said personal data includes interactive data generated on the basis of monitored activity between a client used by an intended recipient and a server.

12. A system as claimed in claim 1, including:
a distribution engine for communicating with a least one distribution gateway for a delivery platform; and
a least one render engine for receiving said second video project files, causing rendering of said videos for a respective delivery platform, and forwarding said videos to said distribution engine for distribution of said videos for said respective delivery platform.

13. A system as claimed in claim 12, including a plurality of said distribution gateway being respectively a television gateway, an instore gateway, an email gateway, a mobile device messaging gateway or a video streaming gateway.

14. A personalised video generation process, including:
storing a first video project file marked with references to:
  (i) content item data defining respectively content items, including at least one of clip, audio and text items, for access;
  (ii) content group data defining respectively one or more content groups for the content items; and
  (iii) rule data defining respectively content substitution rules for access;
displaying content items referenced by said first file grouped based on said groups;
substituting said references to content item data across said first file by adjusting said references based on said groups; and
processing said first file and said rules, based on personal data of intended recipients, by parsing said first video project file and accessing said rules based on said rule data; and
generating a plurality of second video project files for rendering as corresponding videos for said recipients, wherein said rules operate on said personal data to determine content items to be referenced in the plurality of second video project files.

15. A process as claimed in claim 14, wherein said content groups correspond to products.

16. A process as claimed in claim 14, wherein said content groups correspond to a purpose of the videos.

17. A process as claimed in claim 14, wherein said clip items include at least one static image.

18. A process as claimed in claim 14, wherein said clip items include moving image sequences.

19. A process as claimed in claim 14, including accessing and adjusting first video project files grouped based on a selected one of campaign, distribution and product.

20. A process as claimed in claim 14, including accessing and adjusting said references in a first video project file on the basis of a product corresponding to at least one of said content groups.

21. A process as claimed in claim 14, including accessing and editing said references on a hierarchical basis from campaign, distribution, product to content items.

22. A process as claimed in claim 14, wherein said personal data includes customer relationship management (CRM) data obtained from a CRM database.

23. A process as claimed in claim 14, wherein said personal data includes profile data generated from social network data associated with a person.

24. A process as claimed in claim 14, wherein said personal data includes interactive data generated on the basis of monitored activity between a client used by an intended recipient and a server.

25. A process as claimed in claim 14, including:
rendering said videos for respective delivery platforms using said second video project files;
communicating with distribution gateways for respective delivery platforms; and forwarding said videos to the respective distribution gateways for the delivery platforms.

26. A process as claimed in claim 25 wherein said distribution gateways include at least one of a television gateway, an instore gateway, an email gateway, a mobile device messaging gateway and a video streaming gateway.

27. A non-transitory computer readable medium storing program instruction configured to cause one or more processors to implement a personalized video generation process comprising:
storing a first video project file marked with references to:
(i) content item data defining respectively content items, including at least one of clip, audio and text items, for access;
(ii) content group data defining respectively content groups for the content items; and
(iii) rule data defining respectively content substitution rules for access; displaying content items referenced by said first file grouped based on said groups; substituting said references to content item data across said first file by adjusting said references based on said groups; and
processing said first file and said rules, based on personal data of intended recipients by parsing said first video project file and accessing said rules based on said rule data; and
generating a plurality of second video project files for rendering as corresponding videos for said recipients, wherein said rules operate on said personal data to determine content items to be referenced in the plurality of second video project files.

28. A non-transitory computer readable medium as claimed in claim 27, wherein said content groups correspond to products.

29. A non-transitory computer readable medium as claimed in claim 27, wherein said content groups correspond to a purpose of the videos.

30. A non-transitory computer readable medium as claimed in claim 27, wherein said clip items include at least one static image.

31. A non-transitory computer readable medium as claimed in claim 27, wherein said clip items include moving image sequences.

32. A non-transitory computer readable medium as claimed in claim 27, wherein the process includes accessing and adjusting first video project files grouped based on a selected one of campaign, distribution and product.

33. A non-transitory computer readable medium as claimed in claim 27, wherein the process includes accessing and adjusting said references in a first video project file on the basis of a product corresponding to at least one of said content groups.

34. A non-transitory computer readable medium as claimed in claim 27, wherein the process includes accessing and editing said references on a hierarchical basis from campaign, distribution, product to content items.

35. A non-transitory computer readable medium as claimed in claim 27, wherein said personal data includes customer relationship management (CRM) data obtained from a CRM database.

36. A non-transitory computer readable medium as claimed in claim 27, wherein said personal data includes profile data generated from social network data associated with a person.

37. A non-transitory computer readable medium as claimed in claim 27, wherein said personal data includes interactive data generated on the basis of monitored activity between a client used by an intended recipient and a server.

38. A non-transitory computer readable medium as claimed in claim 27, wherein the process includes:
rendering said videos for respective delivery platforms using said second video project files;
communicating with distribution gateways for respective delivery platforms; and forwarding said videos to the respective distribution gateways for the delivery platforms.

39. A non-transitory computer readable medium as claimed in claim 27, wherein said distribution gateways include at least one of a television gateway, an instore gateway, an email gateway, a mobile device messaging gateway and a video streaming gateway.

* * * * *